United States Patent [19]

Goddard

[11] Patent Number: 5,098,726
[45] Date of Patent: Mar. 24, 1992

[54] FOOD PRODUCT

[75] Inventor: Mervyn R. Goddard, Rushden, Great Britain

[73] Assignee: Unilever Patent Holdings B.V., Rotterdam, Netherlands

[21] Appl. No.: 565,445

[22] Filed: Aug. 10, 1990

[30] Foreign Application Priority Data

Aug. 10, 1989 [GB] United Kingdom ............. 8918279

[51] Int. Cl.$^5$ .................. A23B 9/08; A23B 9/10; A23L 1/182
[52] U.S. Cl. .................. 426/444; 426/618
[58] Field of Search ............. 426/618, 524, 444, 309

[56] References Cited

U.S. PATENT DOCUMENTS

| | | | |
|---|---|---|---|
| 2,278,465 | 4/1942 | Mosher | 426/309 |
| 2,813,796 | 11/1957 | Keneaster | 426/444 |
| 2,898,214 | 8/1959 | Ferrel | 426/309 |
| 3,467,528 | 9/1969 | D'Ercole et al. | 426/618 |
| 3,484,249 | 12/1969 | Tanaka et al. | 99/80 |
| 3,655,400 | 4/1972 | Cseri et al. | 99/80 PS |
| 3,692,533 | 9/1972 | Paine | 99/80 PS |
| 4,042,717 | 8/1977 | Gayte | 426/524 |
| 4,086,369 | 4/1978 | Mutoh et al. | 426/519 |
| 4,308,295 | 12/1981 | Kuntz et al. | 426/524 |
| 4,607,495 | 8/1986 | Fujimoto et al. | 426/524 |
| 4,640,842 | 2/1987 | May | 426/618 |
| 4,761,297 | 8/1988 | Sugisawa et al. | 426/618 |

FOREIGN PATENT DOCUMENTS

| | | |
|---|---|---|
| 3641667 | 6/1987 | Fed. Rep. of Germany . |
| 62-58962 | 3/1987 | Japan ............. 426/444 |
| 229413 | 1/1944 | Switzerland . |
| 229413 | 10/1944 | Switzerland . |
| 551758 | 7/1974 | Switzerland . |
| 2184932 | 7/1987 | United Kingdom . |

OTHER PUBLICATIONS

Japanese Abstract J79016577.
Japanese Abstract, vol. 5, No. 152, JP-A-5685245.

*Primary Examiner*—Donald E. Czaja
*Assistant Examiner*—Mary S. Mims
*Attorney, Agent, or Firm*—Cushman, Darby & Cushman

[57] ABSTRACT

Precooked dried rice is obtained by treating rice during or after cooking with an aqueous solution of a saccharide, like dextrose. After draining and rinsing, the treated cooked rice is frozen and dried to a moisture content of 5-10 wt. %.

9 Claims, No Drawings

FOOD PRODUCT

The present invention relates to a method of preparing a precooked, dried rice, to the precooked rice thus obtained and to foodstuffs, or ingredients for foodstuffs, at least partially consisting of said precooked, dried rice.

Numerous proposals have been made concerning the preparation of precooked, dried rice which can be readily rehydrated or reconstituted by simply adding boiling water to it and allowing it to stand for e.g. about 10 minutes. Usually the proposed methods involve a pre-treatment of the rice, followed by cooking the pre-treated rice and then drying it, sometimes preceded by a freezing step. The proposed methods almost invariably lead to a rice product which, upon reconstitution, is either too soft or too tough and the individual identity of the grains is lost owing to the fact that nearly all the grains have been agglomerated into a pasty and sticky mass.

It has now been found that no pre-treatments are necessary before cooking the raw rice, but that the desired effect of obtaining a quickly reconstituting precooked rice which, upon reconstitution, has a desired firmness and in which the individual grains retain their identity, can be reached by treating the rice during or after cooking with an aqueous solution of a saccharide.

It is known from Swiss Patent CH-B-229,413 to polish rice with an aqueous solution of glucose and dextrin containing vitamins, but this is clearly a coating process of raw, uncooked rice.

In US-B-3,655,400 a shelf-stable, intermediate moisture rehydratable rice with a moisture content of 17 to 35% by weight is prepared by cooking the raw rice in a solution of a polyhydric alcohol and an antimycotic agent such that, after drying, the precooked rice contains about 7% by weight of the polyhydric alcohol. In this patent, a rice having a relatively high moisture content is prepared and there is no indication, or even a suggestion, of the use of an aqueous, saccharide-treating solution.

The present invention therefore relates to a method of preparing a precooked, dried rice, which comprises the steps of:

(a) treating the rice during or after cooking with an aqueous solution of a saccharide;

(b) draining and rinsing the treated, cooked rice with water to remove the adherent, aqueous saccharide solution;

(c) freezing the treated, precooked rice, and (d) drying the frozen, treated, precooked rice to a moisture content between 5% and 10% by weight.

In one method according to the present invention, raw common rice is first cooked in water, e.g. for a period of time of up to 45 minutes, optionally after washing the raw rice with water to remove excess surface starch and draining the excess water therefrom. The method may be applied to different types of rice, such as long and short grain rice, par-boiled rice, brown rice, and the like. The choice of the type of rice is dependent on the anticipated end use of the rice. The different types of rice have different cooking time requirements. For long grain rice a cooking time of 15 minutes was found to be very satisfactory; for whole grain rice 40 minutes was a good cooking time; for short grain rice slow boiling for 20–30 minutes appeared to be good.

The precooked rice is then treated with an aqueous solution of a saccharide, e.g. by soaking the precooked rice whilst continuously stirring the rice with the treating solution. The soaking time will vary, depending on the soaking temperature, the type of rice, and the amount and the concentration of the aqueous saccharide solution, but normally a soaking time of up to 7 minutes, preferably from 2 to 5 minutes, will be sufficient if the treating solution has a temperature of from 50° C. to 80° C.

The saccharide used may be sucrose, fructose, glucose, lactose, maltose, dextrose, corn syrup, maltodextrins or other individual sugars or mixtures of sugars. The use of dextrose is preferred, however.

The aqueous saccharide solution may have a concentration of 20% to 75% by weight of saccharide. For the sake of convenience, the treatment step is customarily carried out at room temperature, but elevated temperatures up to the boiling point of the aqueous saccharide solution under atmospheric pressure will reduce the treatment time. It is preferred to keep the temperature of the treatment solution above 60° C. to ensure bacteriological safety. As an example, a treatment for 1–5 minutes at a temperature of 60° C. to 80° C. with an aqueous saccharide solution at a concentration of from 30% to 60% by weight has proved to be very effective.

After the treatment with the aqueous saccharide solution, the rice is drained and the adherent treatment solution is rinsed off the rice with water and subsequently the treated, precooked rice is frozen. This appears to be an important step in the method of the present invention since, without this freezing step, a much slower rehydration and a low-quality product is obtained.

In another embodiment of the present invention, the rice is boiled in the aqueous solution of the saccharide. In this case, for example, a weight ratio of rice: treatment solution of 1:4 may be used. Also in this embodiment, the rice is drained after cooking and the adherent treatment solution is rinsed off the rice with water, after which the treated, precooked rice is frozen. It was found that boiling the rice in an aqueous solution of a saccharide gave a somewhat slower rehydration if the saccharide concentration was higher; so in this case a saccharide solution with a concentration of 15% to 30% by weight is preferred, but 20% by weight is particularly preferred.

The treated, precooked rice is conveniently frozen by spreading it on trays, e.g. in layers of about 12 mm deep, and freezing the rice to a temperature of, e.g., at least −20° C. for a period of time sufficient to deep-freeze the treated, precooked rice entirely. The rate of freezing influences the colour of the frozen product, i.e. a rapidly frozen rice (e.g. obtained by 30 minutes blast freezing at −30° C.) is more yellow and translucent than a slowly frozen rice.

At the end of the freezing, the rice is removed from the trays of the freezing unit and dried, which is preferably effected by hot-air drying in a conventional way (e.g. in a through draught drier at 55° C. or below), optionally at reduced pressure. The drying step ensures that the final product obtained does not float upon reconstitution. The drying is continued until the rice has a moisture content between about 5% and about 10% by weight. At the conclusion of the drying operation, a dried, precooked rice is obtained which can be readily reconstituted by contacting it for about 5 to 10 minutes with boiling water, whereupon a firm, reconstituted grain is obtained, which does not agglomerate into an unpleasant, sticky mass.

The present invention also relates to the precooked, dried rice obtained by the method of the present invention and to foodstuffs, or ingredients for foodstuffs, like, for instance, meals which at least partially consist of the dried, precooked rice according to the present invention.

The invention will now be illustrated by the following Examples, which in no way are to be construed as limiting the scope of the present invention.

EXAMPLE I 500 g of long grain, raw white rice (ex Uncle Ben; Trade Mark) were first rinsed with water to remove any adherent starch, and drained. Subsequently, the rice was cooked for 20 minutes in water. The precooked rice was drained and then soaked for 2 minutes with constant stirring in an aqueous dextrose monohydrate solution of 60% by weight at 60° C.

After this treatment, the treated rice was drained and washed with cold running water for about 1 minute to remove the adherent aqueous dextrose solution. The treated, precooked rice was spread on trays in a layer of about 10 mm thickness and deep-frozen at a temperature of −20° C. for a period of 12 hours.

At the end of the freezing period, the rice was dried in a frozen state to a moisture content of 8% by weight in a drier with forced air circulation with an air temperature of 15° C. After 12 hours, a treated, dried, precooked rice was obtained, which readily rehydrated to an excellent quality rice by soaking it for 5 to 10 minutes in boiling water. The characteristic feature of the rice was the excellent firmness of the grains, which at the same time were not agglomerated.

The product obtained in this Example was compared with Uncle Ben's rice off the shelf with regard to its rehydration characteristics. The rehydration ratio is the final rehydrated weight of the rice, divided by the initial dry weight of the rice. The method used to determine this ratio is as follows : The dry rice is weighed out and this weight is recorded (A). Then 200 ml of boiling water is added to the rice, with stirring, and the mixture is allowed to stand for 5 minutes, after which it is strained through a sieve and the rice is weighed again (B). The rehydration ratio is then A/B.

In this case, Uncle Ben's rice had a rehydration ratio of 2.30 and the product according to Example I had a rehydration ratio of 3.98.

After the 5-minute rehydration in boiling water, Uncle Ben's rice had "gritty bits" in the middle, was very hard and had not fully rehydrated, whereas, after rehydration, the rice according to Example I had a good texture and was fully rehydrated, with no hard bits.

EXAMPLE II 500 g of long grain, par-boiled rice was cooked for 20 minutes in water. The precooked rice was drained and then soaked for 3 minutes with constant stirring in an aqueous solution of glucose syrup (DE = 63) of 60% by weight at 60° C.

After this treatment, the treated rice was drained and washed with cold running water for about 1 minute to remove the adherent aqueous glucose syrup solution. The treated, precooked rice was spread in layers of about 13 mm thickness on trays and deep-frozen at a temperature of −20° C. for a period of 12 hours.

At the end of the freezing period, the rice was further treated as described in Example I. An excellent, readily rehydratable, dried rice was obtained.

EXAMPLE III 500 g of long grain, raw white rice was first rinsed with water to remove any adherent starch, and drained.

Subsequently, the rice was cooked for 20 minutes in an aqueous dextrose monohydrate solution of 20% by weight. The treated cooked rice was drained and washed with cold running water for about 1 minute to remove the adherent dextrose solution and subsequently the rice was treated as described in Example I.

Finally, a treated dried precooked rice was obtained, which readily rehydrated to a very good quality rice by soaking it for 5 to 10 minutes in boiling water. Here also the excellent firmness of the grains was the noteworthy, characteristic feature.

I claim:

1. A method of preparing a precooked, dried rice comprising the steps of:
    (a) treating the rice during or after cooking with an aqueous solution of a saccharide;
    (b) draining and rinsing the treated, cooked rice with water to remove the adherent, aqueous saccharide solution;
    (c) freezing the treated, cooked rice, and
    (d) drying the frozen, treated, cooked rice to a moisture content between 5% and 10% by weight.

2. A method according to claim 1, in which the saccharide is selected from the group consisting of sucrose, fructose, glucose, maltose, lactose, dextrose, corn syrup, maltodextrins, and mixtures thereof.

3. A method according to claim 1, in which the saccharide is dextrose.

4. A method according to claim 1, in which the rice after cooking is treated with an aqueous solution of a saccharide for a period of up to 7 minutes.

5. A method according to claim 1, in which the rice after cooking is treated with an aqueous solution of a saccharide for a period of from 2 to 5 minutes.

6. A method according to claim 1, in which the rice after cooking is treated with an aqueous solution of a saccharide having a temperature of from 50° C. to 80° C.

7. A method according to claim 1, in which the rice after cooking is treated with an aqueous solution of a saccharide having a concentration of 20% to 75% by weight of the saccharide.

8. A method according to claim 1, in which the rice is cooked in an aqueous solution of a saccharide having a concentration of 15—30% by weight of the saccharide.

9. A method according to claim 1, in which in step (d) the drying of the frozen, treated, cooked rice is effected by hot-air drying.

* * * * *